(12) United States Patent
Zhao

(10) Patent No.: US 11,943,057 B2
(45) Date of Patent: Mar. 26, 2024

(54) METHOD AND APPARATUS FOR INDICATING SIDELINK HYBRID AUTOMATIC REPEAT REQUEST (HARQ) FEEDBACK

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 96 days.

(21) Appl. No.: 17/775,499

(22) PCT Filed: Nov. 8, 2019

(86) PCT No.: PCT/CN2019/116596
§ 371 (c)(1),
(2) Date: May 9, 2022

(87) PCT Pub. No.: WO2021/087954
PCT Pub. Date: May 14, 2021

(65) Prior Publication Data
US 2022/0385413 A1    Dec. 1, 2022

(51) Int. Cl.
*H04L 1/1812* (2023.01)
*H04L 1/1607* (2023.01)
(Continued)

(52) U.S. Cl.
CPC .......... *H04L 1/1812* (2013.01); *H04L 1/1614* (2013.01); *H04L 1/1822* (2013.01); *H04L 5/0055* (2013.01); *H04W 76/14* (2018.02)

(58) Field of Classification Search
CPC ... H04L 1/1822; H04L 1/1614; H04L 1/1812; H04L 5/0055; H04L 1/1861;
(Continued)

(56) References Cited

U.S. PATENT DOCUMENTS

| 11,641,570 B2* | 5/2023 | Wang .................... H04W 76/27 |
| | | 370/329 |
| 2019/0150140 A1* | 5/2019 | Patel ........................ H04L 1/08 |
| | | 370/336 |

(Continued)

FOREIGN PATENT DOCUMENTS

| CN | 101431395 A | 5/2009 |
| CN | 110169094 A | 8/2019 |
| CN | 110178389 A | 8/2019 |

OTHER PUBLICATIONS

ISA State Intellectual Property Office of the People's Republic of China, International Search Report Issued in Application No. PCT/CN2019/116596, dated Aug. 11, 2020, with English translation, (6p).

(Continued)

*Primary Examiner* — Guy J Lamarre
*Assistant Examiner* — Osman M Alshack
(74) *Attorney, Agent, or Firm* — Arch & Lake LLP

(57) ABSTRACT

A method for indicating a sidelink HARQ feedback includes: allocating a target resource to a user equipment to perform sidelink communication; sending a downlink control signaling to the user equipment, where the downlink control signaling includes the target resource and first indication information; the first indication information indicates at least one of the followings: when the user equipment uses the target resource allocated by the base station to perform sidelink unicast communication, whether to perform the sidelink HARQ feedback; when the user equipment uses the target resource allocated by the base station to perform sidelink multicast communication, whether to perform the sidelink HARQ feedback; when the user equipment uses the target resource allocated by the base station to perform the (Continued)

Allocate a target resource to a user equipment to perform sidelink communication — 101

Send a downlink control signaling to the user equipment — 102 sidelink multicast communication, a feedback manner of performing the sidelink HARQ feedback.

18 Claims, 5 Drawing Sheets

(51) Int. Cl.
*H04L 1/1822* (2023.01)
*H04L 5/00* (2006.01)
*H04W 76/14* (2018.01)

(58) Field of Classification Search
CPC .... H04L 1/1864; H04L 1/1685; H04W 76/14; H04W 92/18; H04W 76/27
USPC ................................................. 714/748–750
See application file for complete search history.

(56) References Cited

U.S. PATENT DOCUMENTS

| | | | |
|---|---|---|---|
| 2019/0190662 A1 | 6/2019 | Lee et al. | |
| 2019/0305894 A1* | 10/2019 | Hosseini | H04L 1/1685 |
| 2020/0099476 A1* | 3/2020 | Park | H04W 4/70 |
| 2020/0099479 A1* | 3/2020 | Park | H04W 4/70 |
| 2021/0306824 A1* | 9/2021 | Li | H04W 4/40 |
| 2021/0377912 A1* | 12/2021 | El Hamss | H04L 1/1854 |
| 2022/0007403 A1* | 1/2022 | Li | H04W 72/20 |
| 2022/0110067 A1* | 4/2022 | Ryu | H04W 24/08 |
| 2022/0345249 A1* | 10/2022 | Yoshioka | H04L 1/1861 |

OTHER PUBLICATIONS

State Intellectual Property Office of the People's Republic of China, Office Action and Search Report Issued in Application No. 2019800028845, dated Nov. 23, 2021, (Submitted with Machine/Partial Translation), (21p).

OPPO, "Mode 1 resource allocation for NR SL", 3GPP TSG RAN WG1 #98bis, R1-1910373, Chongqing, China, Oct. 14-20, 2019, (8p).

Sequans Communications, "On HARQ procedure for NR sidelink", 3GPP TSG RAN WG1 Meeting #98bis, R1-1911304, Chongqing, China, Oct. 14-20, 2019, (6p).

Huawei et al., "Discussion on HARQ feedback enable and disable", 3GPP TSG-RAN WG2 #106, R2-1907416, Reno, USA, May 13-17, 2019, (5p).

* cited by examiner

METHOD AND APPARATUS FOR INDICATING SIDELINK HYBRID AUTOMATIC REPEAT REQUEST (HARQ) FEEDBACK

CROSS REFERENCE TO RELATED APPLICATIONS

The present application is a U.S. National Stage of International Application No. PCT/CN2019/116596 filed on Nov. 8, 2019, the entire content of which is incorporated herein by reference for all purposes.

TECHNICAL FIELD

The present disclosure relates to the field of communications and in particular to a method and an apparatus for indicating a sidelink Hybrid Automatic Repeat reQuest (HARQ) feedback.

BACKGROUND

New Radio (NR) Vehicle to everything (V2x) supports a resource allocation manner of mode 1. A base station may allocate time domain and frequency domain resources to a user equipment at a sending end of sidelink communication through downlink signaling and the user equipment at the sending end uses the allocated resources to send sidelink control information and sidelink data.

NR V2x further supports enabling and disabling of HARQ feedback for sidelink unicast communication and sidelink multicast communication. When the HARQ feedback is disabled, the user equipment at the receiving end will no longer perform HARQ feedback.

However, for the model resource allocation manner of sidelink communication, whether to enable a HARQ feedback mechanism and which HARQ feedback manner is to be used for sidelink multicast communication in response to enabling the HARQ mechanism have not been correspondingly defined.

SUMMARY

The examples of the present disclosure provide a method and an apparatus for indicating a sidelink Hybrid Automatic Repeat reQuest (HARQ) feedback.

According to a first aspect of the present disclosure, there is provided a method of indicating a sidelink HARQ feedback. The method is applied to a base station and the method includes: allocating a target resource to a user equipment to perform sidelink communication; sending a downlink control signaling to the user equipment, where the downlink control signaling comprises the target resource and first indication information; the first indication information indicates at least one of the followings: in response to that the user equipment uses the target resource allocated by the base station to perform sidelink unicast communication, whether to perform the sidelink HARQ feedback; in response to that the user equipment uses the target resource allocated by the base station to perform sidelink multicast communication, whether to perform the sidelink HARQ feedback; in response to that the user equipment uses the target resource allocated by the base station to perform the sidelink multicast communication, a feedback manner of performing the sidelink HARQ feedback.

According to a second aspect of the present disclosure, there is provided a method of indicating a sidelink Hybrid Automatic Repeat reQuest (HARQ) feedback. The method is applied to a user equipment and includes: receiving a downlink control signaling from a base station, where the downlink control signaling includes a target resource allocated by the base station to the user equipment to perform sidelink communication and first indication information; performing a sidelink HARQ feedback operation and/or reporting a sidelink HARQ feedback result to the base station according to indication of the first indication information; where the first indication information indicates at least one of the followings: in response to that the user equipment uses the target resource allocated by the base station to perform sidelink unicast communication, whether to perform the sidelink HARQ feedback; in response to that the user equipment uses the target resource allocated by the base station to perform sidelink multicast communication, whether to perform the sidelink HARQ feedback; in response to that the user equipment uses the target resource allocated by the base station to perform the sidelink multicast communication, a feedback manner of performing the sidelink HARQ feedback.

According to a third aspect of the present disclosure, there is provided an apparatus for indicating a sidelink Hybrid Automatic Repeat reQuest (HARQ) feedback. The apparatus is applied to a user equipment and includes: a processor; a memory configured to store instructions executable by the processor; where, the processor is configured to: receive a downlink control signaling from a base station, where the downlink control signaling includes a target resource allocated by the base station to the user equipment to perform sidelink communication and first indication information; perform a sidelink HARQ feedback operation and/or report a sidelink HARQ feedback result to the base station according to indication of the first indication information; where the first indication information indicates at least one of the followings: in response to that the user equipment uses the target resource allocated by the base station to perform sidelink unicast communication, whether to perform the sidelink HARQ feedback; in response to that the user equipment uses the target resource allocated by the base station to perform sidelink multicast communication, whether to perform the sidelink HARQ feedback; in response to that the user equipment uses the target resource allocated by the base station to perform the sidelink multicast communication, a feedback manner of performing the sidelink HARQ feedback.

It should be understood that the above general descriptions and subsequent detailed descriptions are merely illustrative and explanatory rather than limiting of the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION

Figure 1:
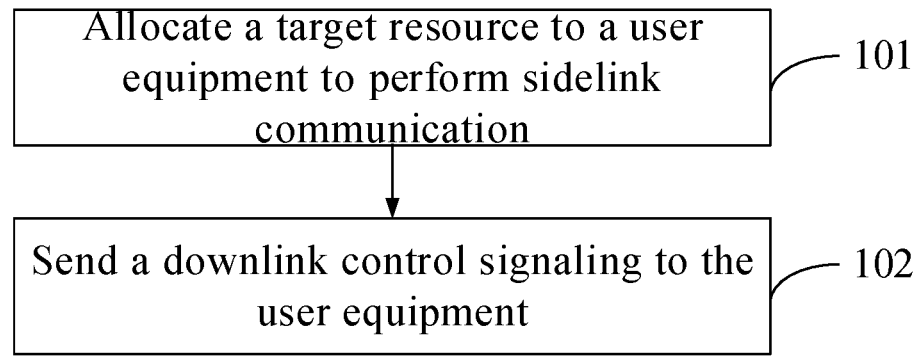
FIG. 1 is a flowchart illustrating a method of indicating a sidelink HARQ feedback according to one or more examples of the present disclosure.

Embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure.

The terms used in the present disclosure are for the purpose of describing particular embodiments only, and are not intended to limit the present disclosure. Terms "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

A method of indicating a sidelink Hybrid Automatic Repeat reQuest (HARQ) feedback provided by the examples of the present disclosure is firstly described below at the base station side.

In an example of the present disclosure, a method of indicating a sidelink HARQ feedback is provided. The method may be applied to a base station. FIG. 1 is a flowchart illustrating a method of indicating a sidelink HARQ feedback according to one or more examples of the present disclosure. The method may include the following steps.

At step 101, a target resource is allocated to a user equipment to perform sidelink communication.

In this step, the target resource is a time resource and/or a frequency resource allocated by the base station for the user equipment to perform the sidelink communication within at least one period.

At step 102, a downlink control signaling is sent to the user equipment.

In an example of the present disclosure, the downlink control signaling may be downlink Radio Resource Control (RRC) information or Downlink Control Information (DCI). The downlink control signaling includes the target resource configured by the base station for the user equipment. In addition, the downlink control signaling also includes first indication information, where the first indication information indicates at least one of the followings:

when the user equipment uses the target resource allocated by the base station to perform sidelink unicast communication, whether to perform the sidelink HARQ feedback;

when the user equipment uses the target resource allocated by the base station to perform sidelink multicast communication, whether to perform the sidelink HARQ feedback;

when the user equipment uses the target resource allocated by the base station to perform the sidelink multicast communication, a feedback manner of performing the sidelink HARQ feedback.

The user equipment may, based on the first indication information, determine whether to perform the sidelink HARQ feedback when using the target resource to perform the sidelink unicast communication or the sidelink multicast communication, and the feedback manner of performing the sidelink HARQ feedback when performing the sidelink multicast communication.

In the above example, for the target resource allocated by the base station to the user equipment, whether to perform the HARQ feedback when the user equipment uses the target resource to perform the sidelink unicast communication and/or the sidelink multicast communication, and the feedback manner of performing the sidelink HARQ feedback when performing the sidelink multicast communication are indicated.

In an example, if the base station allocates the target resource to the user equipment to perform the sidelink unicast communication, correspondingly, the first indication information may indicate, when the user equipment uses the target resource allocated by the base station to perform the sidelink unicast communication, whether to perform the sidelink HARQ feedback.

The user equipment may, based on the content of the first indication information, determine whether to perform the sidelink HARQ feedback when using the target resource to perform the sidelink unicast communication, and feed back ACK upon successful reception of data after determining the sidelink HARQ feedback is to be performed, or feed back NACK.

In the above example, by using the above manner, for the target resource allocated by the base station to the user equipment to perform the sidelink unicast communication, whether to perform the sidelink HARQ feedback when the user equipment performs the sidelink unicast communication is determined.

In an example, if the base station allocates the target resource to the user equipment to perform the sidelink multicast communication, correspondingly, the first indication information indicates at least one of the followings:
  when the user equipment uses the target resource allocated by the base station to perform the sidelink multicast communication, whether to perform the sidelink HARQ feedback;
  when the user equipment uses the target resource allocated by the base station to perform the sidelink multicast communication, the feedback manner of performing the sidelink HARQ feedback.

The user equipment may, based on the content of the first indication information, determine whether to perform the sidelink HARQ feedback when using the target resource allocated by the base station to perform the sidelink multicast communication and the feedback manner of performing the sidelink HARQ feedback.

In the above example, for the target resource allocated by the base station to the user equipment to perform the sidelink multicast communication, whether to perform the sidelink HARQ feedback when the user equipment performs the sidelink multicast communication and the feedback manner of performing the sidelink HARQ feedback are determined.

In some examples, the downlink control signaling includes second indication information.

In an example of the present disclosure, the second indication information may indicate that the sidelink communication performed by the user equipment is the sidelink unicast communication or the sidelink multicast communication.

For example, the base station may use 3 bits in the downlink control signaling, for example, in the downlink RRC information or DCI to indicate whether the user equipment may use the target resource to send sidelink unicast data, sidelink multicast data or sidelink broadcast data. If each bit is 0, it indicates that the target resource is not allowed to be used to send the corresponding sidelink data; and if each bit is 1, it indicates that the target resource is allowed to be used to send the corresponding sidelink data. In an example of the present disclosure, only when the user equipment may use the target resource in unicast and/or multicast communication, the content of the first indication information is valid and otherwise, invalid.

In some examples, if the downlink control signaling, for example, the downlink RRC information or DCI, does not include the second indication information, the user equipment defaults to use the target resource in all transmission modes (sidelink unicast, sidelink multicast or sidelink broadcast). The user equipment determines to or not to perform the sidelink HARQ feedback based on the content of the first indication information only when performing the sidelink unicast communication or the sidelink multicast communication, and performs the sidelink HARQ feedback by using the feedback manner indicated by the first indication information when performing the sidelink multicast communication and required to perform the sidelink HARQ feedback.

In some examples, the downlink control signaling includes third indication information.

The base station may include the third indication information in the downlink control signaling, for example, in the downlink RRC information or DCI.

The third indication information indicates a target address for performing the sidelink communication, and the target address indicates the sidelink communication performed by the user equipment is the sidelink unicast communication or the sidelink multicast communication.

For example, when the target address indicated by the third indication information is a unicast address, the user equipment may perform the sidelink unicast communication, and the first indication information may indicate, when the user equipment uses the target resource allocated by the base station to perform the sidelink unicast communication, whether to perform the sidelink HARQ feedback.

When the target address indicated by the third indication information is a multicast address, the user equipment may perform the sidelink multicast communication, and the first indication information may indicate, when the user equipment uses the target resource allocated by the base station to perform the sidelink multicast communication, whether to perform the sidelink HARQ feedback and the feedback manner of performing the sidelink HARQ feedback.

When the target address indicated by the third indication information is a broadcast address, the first indication information does not include the above content or the first indication information is invalid.

In the above example, the base station may include second indication information or third indication information in the downlink control signaling. The second indication information indicates that the sidelink communication performed by the user equipment is the sidelink unicast communication or the sidelink multicast communication, and the target address indicates the sidelink communication performed by the user equipment is the sidelink unicast communication or the sidelink multicast communication. When the second indication information or the target address indicates the sidelink unicast communication or the sidelink multicast communication, the user equipment may determine whether to perform the sidelink HARQ feedback and a corresponding sidelink HARQ feedback manner based on the content of the first indication information, thereby increasing the availability.

In an example, when the downlink control signaling is the downlink RRC information, the base station may configure the target resource for sending a sidelink communication control channel and/or data channel for the user equipment based on the downlink RRC information. The base station may carry the target resource and the first indication information in the downlink RRC information and send the downlink RRC information to the user equipment.

In the above example, when configuring the target resource for the user equipment by using the downlink RRC information, the base station may carry the target resource and the first indication information in the downlink RRC information and send the downlink RRC information to the user equipment. In this process, the base station may carry the first indication information by use of the downlink RRC information for allocating the target resource, thus saving signaling resource, bringing easy implementation and high availability.

In an example, an information domain corresponding to the first indication information may be pre-allocated in the downlink RRC information, and the content of the first indication information may be notified to the user equipment directly by using a bit value of the information domain.

In some examples of the present disclosure, the information domain corresponding to the first indication information may respectively identify whether to perform the sidelink HARQ feedback in response to the sidelink unicast communication and the sidelink multicast communication by a separate bit value.

For example, the information domain has two bits. When a first bit value is 1, it indicates that the user equipment is to perform the sidelink HARQ feedback when performing the sidelink unicast communication; and when the first bit value is 0, it indicates the user equipment is not to perform the sidelink HARQ feedback when performing the sidelink unicast communication. Similarly, when a second bit value is 1, it indicates that the user equipment is to perform the sidelink HARQ feedback when performing the sidelink multicast communication; and when the second bit value is 0, it indicates that the user equipment is not to perform the sidelink HARQ feedback when performing the sidelink multicast communication.

Alternatively, the information domain corresponding to the first indication information may indicate the content corresponding to the first indication information by using bit combination.

For example, the information domain has two bits. When the bit value is 00, it indicates that no sidelink HARQ feedback is performed regardless of the sidelink unicast communication or the sidelink multicast communication. When the bit value of the information domain is 01, it indicates that in response to the sidelink unicast communication and the sidelink multicast communication, the sidelink HARQ feedback is performed, and the feedback manner of performing the sidelink HARQ feedback in response to the sidelink multicast communication is to feed back NACK only in response to incorrect reception of data. When the bit value of the information domain is 10, it indicates that in response to the sidelink unicast communication and the sidelink multicast communication, the sidelink HARQ feedback is performed, and the feedback manner of performing the sidelink HARQ feedback in response to the sidelink multicast communication is to feed back ACK upon correct reception and feed back NACK upon incorrect reception. When the bit value of the information domain is 11, it indicates that in response to the sidelink unicast communication and the sidelink multicast communication, the sidelink HARQ feedback is performed, and the feedback manner in response to the sidelink multicast communication is determined by the user equipment itself.

If the information domain corresponding to the first indication information may indicate the content of the first indication information by using a bit combination and the information domain includes two bits, the two bits indicate, by default, whether to perform the sidelink HARQ feedback for the corresponding sidelink unicast communication and sidelink multicast communication and the feedback manner of performing the sidelink HARQ feedback in response to the sidelink multicast communication and do not indicate the circumstance corresponding to the sidelink broadcast communication. If the information domain include three or more bits, these bits may indicate whether to perform the sidelink HARQ feedback for the corresponding sidelink unicast communication, sidelink multicast communication and sidelink broadcast communication together or indicate whether to perform the sidelink HARQ feedback and a corresponding feedback manner for different sidelink communications by using different bits according to an agreement between the station and the user equipment, which is not limited herein.

Alternatively, in an example of the present disclosure, the information domain corresponding to the first indication information may not be configured in the downlink RRC information, but the content corresponding to the first indication information is notified to the user equipment in an implicit manner.

In some examples, the downlink RRC information indicates the content corresponding to the first indication information based on whether a Physical Uplink Control CHannel (PUCCH) resource configuration used by the user equipment to report HARQ feedback information corresponding to the sidelink communication is included.

For example, if the downlink RRC information includes the PUCCH resource configuration, the user equipment may think that the content of the first indication information is to perform the sidelink HARQ feedback when performing the sidelink unicast communication or the sidelink multicast communication. If the downlink RRC information does not include the PUCCH resource configuration, no sidelink HARQ feedback is performed when performing the sidelink unicast communication or the sidelink multicast communication.

In the above example, the downlink RRC information sent by the base station may directly include a pre-allocated information domain corresponding to the first indication information, and the user equipment may determine the content of the first indication information based on the bit value of the information domain. Alternatively, the downlink RRC information sent by the base station may not include the information domain, but the content to be indicated by the first indication information is indicated implicitly based on whether the PUCCH resource configuration used by the user equipment to report HARQ feedback information corresponding to the sidelink communication is included. In the above manner, the user equipment is enabled to quickly determine the content of the first indication information, leading to high availability.

In an example, when the downlink control signaling is DCI, the base station may schedule the target resource for sending a sidelink communication control channel and/or data channel for the user equipment based on the DCI. The base station carries the target resource and the first indication information in the DCI and sends the DCI to the user equipment.

In the above example, the base station may also carry the target resource and the first indication information by using the DCI for scheduling the target resource and send the DCI to the user equipment. In the above process, the base station may carry the target resource and the first indication information by using the DCI for allocating the target resource, thereby saving signaling resource, bringing easy implementation and high availability. In an example, when the first indication information is carried by the DCI, a preset value of a specified information domain the DCI may indicate the content corresponding to the first indication information, or a preset combination of values of the specified information domain of the DCI may indicate the content corresponding to the first indication information.

For example, two separate bits of the specified information domain in the DCI are used to respectively indicate whether to perform the HARQ feedback when performing the sidelink unicast communication or the sidelink multicast communication, or a combination of two bit values in the specified information domain is used to indicate the content of the first indication information. The specific manner is the same as the manner in which the content of the first indication information is indicated by use of combination of two bit values in the downlink RRC information, which is not repeated herein.

For another example, when the above second resource configuration manner is adopted, the base station may send the downlink control signaling, for example, the downlink RRC information and DCI, to the user equipment. The DCI includes an information domain indicating reporting the PUCCH resource position for transmitting the HARQ feedback information to the base station, the base station pre-configures one group of PUCCH resources (8 at most) to the user equipment by using the RRC information, and one bit is selected from the information domain (for example, the information domain includes 3 bits) in the DCI to transmit the HARQ feedback information.

Less than 8 PUCCH resources may be configured by using the downlink RRC information. If 7 PUCCH resources are configured, the un-configured resource, for example, the eighth resource, indicates not performing the sidelink HARQ feedback when performing the sidelink unicast communication or the sidelink multicast communication. If one configured PUCCH resource is indicated by the DCI, it indicates performing the sidelink HARQ feedback when performing the sidelink unicast communication or the sidelink multicast communication.

In the above example, the base station may indicate the content corresponding to the first indication information by using the preset value of the specified information domain in the DCI, or indicate the content corresponding to the first indication information by using the preset combination of values of the specified information domain in the DCI. In the above process, the user equipment is enabled to quickly determine the content of the first indication information, leading to high availability.

In some examples, the target resource and the first indication information may use a same downlink control signaling, for example, the target resource and the first indication information are sent at the same time by using the downlink RRC information, or by using the DCI.

Different downlink control signalings may be used, for example, the target resource is sent by using the downlink RRC information, and a resource usable by the user equipment in a current period in the target resource and the first indication information are sent by using the DCI, or the target resource and the first indication information are sent by using the downlink RRC information and a resource usable by the user equipment in a current period in the target resource is sent by using the DCI.

In the above example, the base station send the target resource and the first indication information at the same time by using a same downlink control signaling, or send the target resource and the first indication information by using different downlink control signalings respectively, which is not limited herein.

A method of indicating a sidelink Hybrid Automatic Repeat reQuest (HARQ) feedback provided by the examples of the present disclosure will be described below at the user equipment side.

Figure 2:
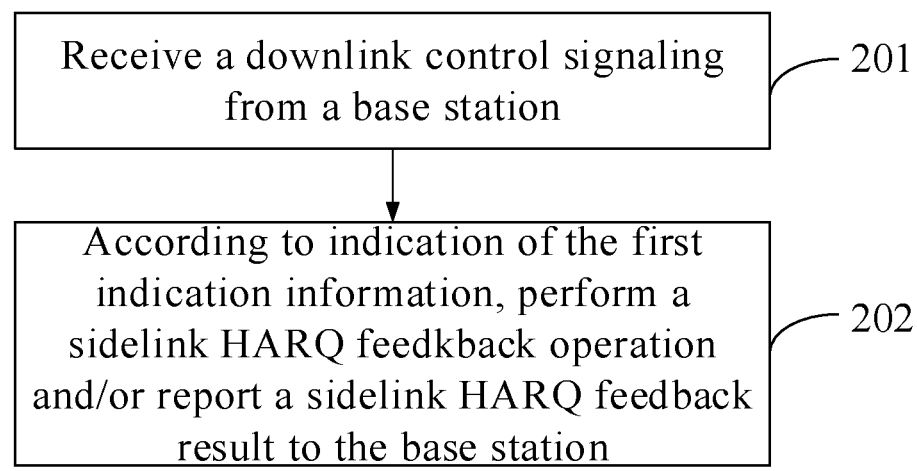
FIG. 2 is a flowchart illustrating another method of indicating a sidelink HARQ feedback according to one or more examples of the present disclosure.

The method of indicating a sidelink HARQ feedback provided by the examples of the present disclosure may be applied to a user equipment. The user equipment may be a handheld terminal of a user in a vehicle network, or another vehicle-mounted device or the like. FIG. 2 is a flowchart illustrating another method of indicating a sidelink HARQ feedback according to one or more examples of the present disclosure. The method may include the following steps.

At step 201, a downlink control signaling is received from a base station.

In an example of the present disclosure, the downlink control signaling may be downlink RRC information or DCI. The downlink control signaling includes a target resource and first indication information. The target resource is time resource and frequency resource allocated by the base station to the user equipment to perform sidelink communication. The first indication information indicates at least one of the followings:

when the user equipment uses the target resource allocated by the base station to perform sidelink unicast communication, whether to perform the sidelink HARQ feedback;

when the user equipment uses the target resource allocated by the base station to perform sidelink multicast communication, whether to perform the sidelink HARQ feedback;

when the user equipment uses the target resource allocated by the base station to perform the sidelink multicast communication, a feedback manner of performing the sidelink HARQ feedback.

At step 202, according to indication of the first indication information, a sidelink HARQ feedback operation is performed and/or a sidelink HARQ feedback result is reported to the base station.

The user equipment may, after receiving the first indication information from the base station, perform the sidelink HARQ feedback operation and report the sidelink HARQ feedback result to the base station based on the indication of the first indication information.

In the above example, after receiving the downlink control signaling including the target resource and the first indication information from the base station, the user equipment may, based on the indication of the first indication information, perform the sidelink HARQ feedback operation and/or report the sidelink HARQ feedback result to the base station. The first indication information indicates at least one of: when the user equipment uses the target resource allocated by the base station to perform the sidelink unicast communication or the sidelink multicast communication, whether to perform sidelink HARQ feedback; and when the user equipment uses the target resource allocated by the base station to perform the sidelink multicast communication, the feedback manner of performing the sidelink HARQ feedback. By the above process, for the target resource allocated by the base station to the user equipment, the user equipment may, based on the content of the first indication information, perform the sidelink HARQ feedback operation and/or report the sidelink HARQ feedback result to the base station when performing the sidelink unicast communication and/or the sidelink multicast communication using the target resource.

In an example, performing the sidelink HARQ feedback operation based on the indication of the first indication information in step 202 may include the following step:

at step 202-1, when the user equipment is taken as a sending end device of the sidelink communication, fourth indication information is sent to a receiving end device of the sidelink communication according to the first indication information.

The fourth indication information includes at least one of the followings:

whether to perform the sidelink HARQ feedback;

when the sidelink communication is multicast communication, the feedback manner of performing the sidelink HARQ feedback.

In this step, the user equipment, as the sending end device of the sidelink communication, may send the fourth indication information to the receiving end device based on the first indication information. The receiving end device may, based on the fourth indication information, determine whether to perform the sidelink HARQ feedback and the feedback manner of performing the sidelink HARQ feedback when the sidelink communication is multicast communication.

In the above example, the user equipment, as the sending end device of the sidelink communication, may send the fourth indication information to the receiving end device, such that the receiving end device may, based on the fourth indication information, determine whether to perform the sidelink HARQ feedback and the feedback manner of performing the sidelink HARQ feedback when the sidelink communication is multicast communication, thus increasing the availability.

In an example, the user equipment may carry the fourth indication information in Sidelink Control Information (SCI) and send the fourth indication information to the receiving end device by using the SCI.

In the above example, the user equipment, as the sending end device, can send the fourth indication information to the receiving end device by using the SCI, leading to easy implementation and high availability.

In an example, performing the sidelink HARQ feedback operation based on the indication of the first indication information in step 202 may include the following:

at step 202-2, when the first indication information indicates not performing the sidelink HARQ feedback, a correct reception (ACK) result is reported to the base station.

In an example of the present disclosure, if the first indication information indicates not performing the sidelink HARQ feedback in response to the sidelink unicast communication or the sidelink multicast communication, the user equipment at receiving end may always report a correct reception (ACK) result to the base station.

In some examples, the downlink control signaling includes second indication information.

The downlink control signaling may be the downlink RRC information or DCI. The second indication information indicates the sidelink communication performed by the user equipment is the sidelink unicast communication or the sidelink multicast communication.

Alternatively, the downlink control signaling includes third indication information.

The third indication information indicates a target address for performing the sidelink communication and the target address indicates the sidelink communication performed by the user equipment is the sidelink unicast communication or the sidelink multicast communication.

In an example of the present disclosure, if the second indication information or the target address indicates the sidelink communication performed by the user equipment is the sidelink unicast communication, the first indication information indicates, when the user equipment uses the target resource allocated by the base station to perform the sidelink unicast communication, whether to perform the sidelink HARQ feedback. The user equipment may, based on the indication of the first indication information, perform the sidelink HARQ feedback operation and/or report the sidelink HARQ feedback result to the base station.

If the second indication information or the target address indicates the sidelink communication performed by the user equipment is the sidelink unicast communication, the first indication information indicates, when the user equipment uses the target resource allocated by the base station to perform the sidelink unicast communication, whether to perform the sidelink HARQ feedback. Similarly, the user equipment may, based on the indication of the first indication information, perform the sidelink HARQ feedback operation and/or report the sidelink HARQ feedback result to the base station.

When the second indication information or the target address indicates the sidelink communication performed by the user equipment is the sidelink multicast communication, the first indication information indicates at least one of the followings: when the user equipment uses the target resource allocated by the base station to perform the sidelink multicast communication, whether to perform the sidelink HARQ feedback; when the user equipment uses the target resource allocated by the base station to perform the sidelink multicast communication, the feedback manner of performing the sidelink HARQ feedback. Similarly, the user equipment may, based on the indication of the first indication information, perform the sidelink HARQ feedback operation and/or report the sidelink HARQ feedback result to the base station.

In an example, the base station indicates the target resource and the first indication information at the same time by using the downlink RRC information, the user equipment may continue performing step 202 to, based on the indication of the first indication information, perform the sidelink HARQ feedback operation and/or report the sidelink HARQ feedback result to the base station.

In an example, the downlink RRC information includes a pre-allocated information domain corresponding to the first indication information, and thus the user equipment may determine the content of the first indication information based directly on a bit value of the information domain corresponding to the first indication information. For example, the information domain has two bits. When a first bit value is 1, it indicates that the user equipment is to perform the sidelink HARQ feedback when performing the sidelink unicast communication; and when the first bit value is 0, it indicates the user equipment is not to perform the sidelink HARQ feedback when performing the sidelink unicast communication. Similarly, when a second bit value is 1, it indicates that the user equipment is to perform the sidelink HARQ feedback when performing the sidelink multicast communication; and when the second bit value is 0, it indicates that the user equipment is not to perform the sidelink HARQ feedback when performing the sidelink multicast communication.

Alternatively, the information domain has two bits. When the bit value is 00, it indicates that no sidelink HARQ feedback is performed regardless of the sidelink unicast communication or the sidelink multicast communication. When the bit value is 01, it indicates that in response to the sidelink unicast communication and the sidelink multicast communication, the sidelink HARQ feedback is performed, and the feedback manner of performing the sidelink HARQ feedback in response to the sidelink multicast communication is to feed back NACK only in response to incorrect reception of data. When the bit value is 10, it indicates that in response to the sidelink unicast communication and the sidelink multicast communication, the sidelink HARQ feedback is performed, and the feedback manner of performing the sidelink HARQ feedback in response to the sidelink multicast communication is to feed back ACK upon correct reception and feed back NACK upon incorrect reception. When the bit value is 11, it indicates that in response to the sidelink unicast communication and the sidelink multicast communication, the sidelink HARQ feedback is performed, and the feedback manner in response to the sidelink multicast communication is determined by the user equipment itself.

If the information domain corresponding to the first indication information may indicate the content corresponding to the first indication information by using a bit combination and the information domain includes two bits, the two bits indicate, by default, whether to perform the sidelink HARQ feedback for the corresponding sidelink unicast communication and sidelink multicast communication and the feedback manner of performing the sidelink HARQ feedback in response to the sidelink multicast communication and do not indicate the circumstance corresponding to the sidelink broadcast communication. If the information domain include three or more bits, these bits may indicate whether to perform the sidelink HARQ feedback for the corresponding sidelink unicast communication, sidelink multicast communication and sidelink broadcast communication together or indicate whether to perform the sidelink HARQ feedback and a corresponding feedback manner for different sidelink communications by using different bits according to an agreement between the station and the user equipment, which is not limited herein.

In some examples of the present disclosure, the downlink RRC information indicates the content corresponding to the first indication information based on whether a Physical Uplink Control CHannel (PUCCH) resource configuration used by the user equipment to report HARQ feedback information corresponding to the sidelink communication is included.

when the downlink RRC information includes the PUCCH resource configuration, the user equipment may determine that the content corresponding to the first indication information is that, when the user equipment uses the target resource allocated by the base station to perform the sidelink unicast communication or the sidelink multicast communication, the sidelink HARQ feedback is performed.

When the downlink RRC information does not include the PUCCH resource configuration, the user equipment may determine that the content corresponding to the first indication information is that, when the user equipment uses the target resource allocated by the base station to perform the sidelink unicast communication or the sidelink multicast communication, the sidelink HARQ feedback is not performed.

In the above manner, the content of the first indication information may be indicated implicitly in the downlink RRC information, leading to high availability.

In an example, the downlink control signaling may also be the DCI. The target resource and the first indication information are carried in the DCI.

The base station may send the target resource and the first indication information to the user equipment by using the DCI. After receiving them, the user equipment may perform the step 202.

In an example, the DCI indicates the content corresponding to the first indication information by using a preset value of a specified information domain; or the DCI indicates the content corresponding to the first indication information by using a preset combination of values of the specified information domain.

For example, two separate bits of the specified information domain in the DCI are used to respectively indicate whether to perform the HARQ feedback when performing the sidelink unicast communication or the sidelink multicast communication, or a combination of two bit values in the specified information domain is used to indicate the content of the first indication information. The specific manner is the same as the manner in which the content of the first indication information is indicated by use of combination of two bit values in the downlink RRC information, which is not repeated herein.

For another example, when the above second resource configuration manner is adopted, the base station may send the downlink control signaling, for example, the downlink RRC information and DCI, to the user equipment. The DCI includes an information domain indicating reporting the PUCCH resource position for transmitting the HARQ feedback information to the base station, the base station preconfigures one group of PUCCH resources (8 at most) to the user equipment by using the RRC information, and one bit is selected from the information domain (for example, the information domain includes 3 bits) in the DCI to transmit the HARQ feedback information.

Less than 8 PUCCH resources may be configured by using the downlink RRC information. If 7 PUCCH resources are configured, the un-configured resource, for example, the eighth resource, indicates not performing the sidelink HARQ feedback when performing the sidelink unicast communication or the sidelink multicast communication. If one configured PUCCH resource is indicated by the DCI, it indicates performing the sidelink HARQ feedback when performing the sidelink unicast communication or the sidelink multicast communication.

In some examples, the target resource and the first indication information may use a same downlink control signaling, for example, the target resource and the first indication information are sent at the same time by using the downlink RRC information, or by using the DCI.

Different downlink control signalings may be used, for example, the target resource is sent by using the downlink RRC information, and a resource usable by the user equipment in a current period in the target resource and the first indication information are sent by using the DCI, or the target resource and the first indication information are sent by using the downlink RRC information and a resource usable by the user equipment in a current period in the target resource is sent by using the DCI.

According to the indication of the first indication information in the received downlink RRC information or DCI, the user equipment performs the sidelink HARQ feedback operation and/or report the sidelink HARQ feedback result to the base station.

The method of indicating a sidelink HARQ feedback provided above will be further described below with examples.

For the first allocation solution in the model resource allocation manner of the sidelink communication, the downlink control signaling is the downlink RRC information, that is, the target resource is configured for the user equipment by using the semi-static downlink RRC information, and the base station may carry the target resource and the first indication information in the downlink RRC information.

In an example of the present disclosure, the downlink RRC information may include a pre-allocated information domain corresponding to the first indication information. In some examples, the first indication information may respectively indicate, by using separate bit values, whether to perform the sidelink HARQ feedback when performing the sidelink unicast communication or the sidelink multicast communication, or indicate the corresponding content by using combination of two bits. Alternatively, the downlink RRC information indicates the content corresponding to the first indication information based on whether a Physical Uplink Control CHannel (PUCCH) resource configuration used by the user equipment to report HARQ feedback information corresponding to the sidelink communication is included.

In an example of the present disclosure, the downlink RRC information may further include second indication information or third indication information. The second indication information indicates the sidelink communication performed by the user equipment is the sidelink unicast communication or the sidelink multicast communication, the third indication information indicates a target address for performing the sidelink communication, and the target address indicates the sidelink communication performed by the user equipment is the sidelink unicast communication or the sidelink multicast communication.

When the second indication information or the target address indicates performing the sidelink unicast communication or the sidelink multicast communication, the user equipment performs the sidelink HARQ feedback operation and/or report the sidelink HARQ feedback result to the base station based on the indication of the first indication information.

Performing, by the user equipment, the sidelink HARQ feedback operation based on the indication of the first indication information means that the user equipment, as a sending end device, may send fourth indication information to a receiving end device by using the SCI based on the first indication information. information Reporting, by the user equipment, the sidelink HARQ feedback result to the base station based on the indication of the first indication information means that when the first indication information indicates not performing the sidelink HARQ feedback, a correct reception (ACK) result is reported to the base station.

For the third allocation solution in the model resource allocation manner of the sidelink communication, the downlink control signaling is the DCI, that is, the base station configures the target resource for the user equipment based on the DCI, and the base station may carry the target resource and the first indication information in the DCI.

In an example of the present disclosure, the base station may indicate the content corresponding to the first indication information by using a preset value of a specified information domain in the DCI; or indicate the content corresponding to the first indication information by using a preset combination of values of the specified information domain in the DCI. The specific manner is the same as that in the above examples and will not be repeated herein.

In some examples, the specified information domain may be an information domain irrelevant to sidelink resource scheduling in the DCI, for example, a Modulation and Coding Scheme (MSC) information domain.

Similarly, the user equipment may perform the sidelink HARQ feedback operation and/or report the sidelink HARQ feedback result to the base station based on the indication of the first indication information.

For the second allocation solution in the model resource allocation manner of the sidelink communication, the base station firstly allocates the target resource to the user equipment by using the downlink RRC information and indicates the specific usable resource by using the DCI each time. Correspondingly, the first indication information may be carried in the downlink RRC information or the DCI, and the user equipment may, based on the indication of the first indication information, perform the sidelink HARQ feedback operation and/or report the sidelink HARQ feedback result to the base station.

In the above example, for the target resource allocated by the base station to the user equipment, whether to perform the HARQ feedback when the user equipment uses the target resource to the user equipment to perform the sidelink unicast communication and/or the sidelink multicast communication, and the feedback manner of performing the sidelink HARQ feedback in response to performing the sidelink multicast communication are indicated.

Corresponding to the above examples with the application functions implementing the methods, apparatus examples with application functions implementing apparatuses are further provided in the present disclosure.

Figure 3:
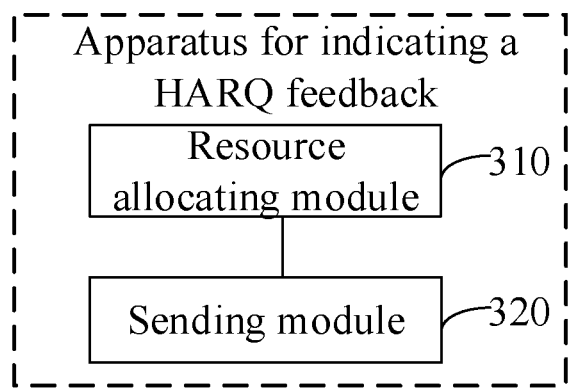
FIG. 3 is a block diagram illustrating an apparatus for indicating a sidelink HARQ feedback according to one or more examples of the present disclosure.

FIG. 3 is a block diagram illustrating an apparatus for indicating a sidelink Hybrid Automatic Repeat reQuest (HARQ) feedback according to one or more examples of the present disclosure. The apparatus is applied to a base station and includes:
- a resource allocating module 310, configured to allocate a target resource to a user equipment to perform sidelink communication;
- a sending module 320, configured to send a downlink control signaling to the user equipment, where the downlink control signaling includes the target resource and first indication information; the first indication information indicates at least one of the followings:
- when the user equipment uses the target resource allocated by the base station to perform sidelink unicast communication, whether to perform the sidelink HARQ feedback;
- when the user equipment uses the target resource allocated by the base station to perform sidelink multicast communication, whether to perform the sidelink HARQ feedback;
- when the user equipment uses the target resource allocated by the base station to perform the sidelink multicast communication, a feedback manner of performing the sidelink HARQ feedback.

Figure 4:
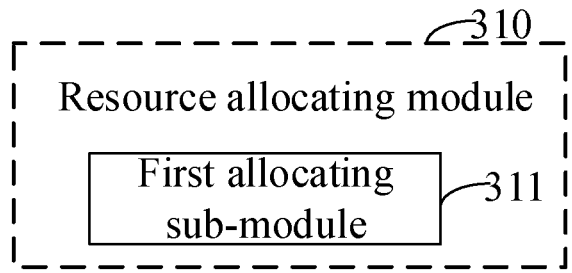
FIG. 4 is a block diagram illustrating another apparatus for indicating a sidelink HARQ feedback according to one or more examples of the present disclosure.

FIG. 4 is a block diagram illustrating another apparatus for indicating a sidelink Hybrid Automatic Repeat reQuest (HARQ) feedback according to one or more examples of the present disclosure. The resource allocating module 310 includes:

a first allocating sub-module 311, configured to allocate the target resource to the user equipment to perform the sidelink unicast communication;
where the first indication information indicates, when the user equipment uses the target resource allocated by the base station to perform the sidelink unicast communication, whether to perform the sidelink HARQ feedback.

Figure 5:
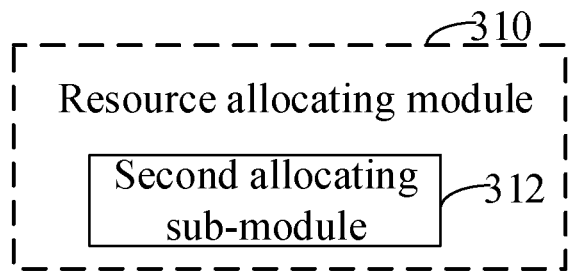
FIG. 5 is a block diagram illustrating an apparatus for indicating a sidelink HARQ feedback according to one or more examples of the present disclosure.

FIG. 5 is a block diagram illustrating another apparatus for indicating a sidelink Hybrid Automatic Repeat reQuest (HARQ) feedback based on the example of FIG. 3. The resource allocating module 310 includes:
a second allocating sub-module 312, configured to allocate the target resource to the user equipment to perform the sidelink multicast communication;
where the first indication information indicates at least one of the followings: when the user equipment uses the target resource allocated by the base station to perform the sidelink multicast communication, whether to perform the sidelink HARQ feedback;
when the user equipment uses the target resource allocated by the base station to perform the sidelink multicast communication, the feedback manner of performing the sidelink HARQ feedback.

In some examples, the downlink control signaling includes second indication information; where the second indication information indicates that the sidelink communication performed by the user equipment is the sidelink unicast communication or the sidelink multicast communication; or
the downlink control signaling includes third indication information; where the third indication information indicates a target address for performing the sidelink communication, and the target address indicates the sidelink communication performed by the user equipment is the sidelink unicast communication or the sidelink multicast communication.

Figure 6:
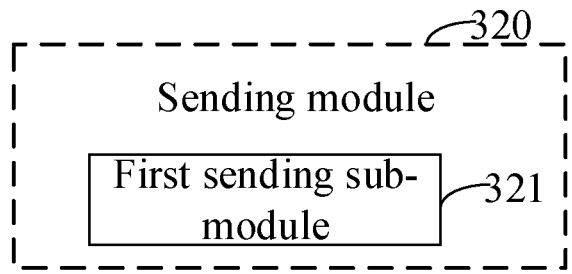
FIG. 6 is a block diagram illustrating another apparatus for indicating a sidelink HARQ feedback according to one or more examples of the present disclosure.

FIG. 6 is a block diagram illustrating another apparatus for indicating a sidelink Hybrid Automatic Repeat reQuest (HARQ) feedback based on the example of FIG. 3. The sending module 320 includes:
a first sending sub-module 321, configured to, when downlink radio resource control (RRC) information is used to configure the target resource for sending a sidelink communication control channel and/or data channel for the user equipment, carry the target resource and the first indication information in the downlink RRC information and send the downlink RRC information to the user equipment.

In some examples, the downlink RRC information includes a pre-allocated information domain corresponding to the first indication information; or
the downlink RRC information indicates a content corresponding to the first indication information based on whether a Physical Uplink Control CHannel (PUCCH) resource configuration used by the user equipment to report HARQ feedback information corresponding to the sidelink communication is included.

Figure 7:
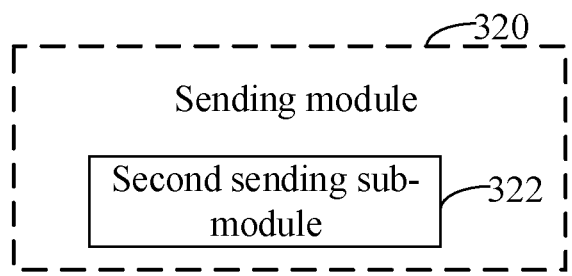
FIG. 7 is a block diagram illustrating an apparatus for indicating a sidelink HARQ feedback according to one or more examples of the present disclosure.

FIG. 7 is a block diagram illustrating another apparatus for indicating a sidelink Hybrid Automatic Repeat reQuest (HARQ) feedback based on the example of FIG. 3. The sending module 320 includes:
a second sending sub-module 322, configured to, when downlink control information (DCI) is used to schedule the target resource for sending the sidelink communication control channel and/or data channel for the user equipment, carry the target resource and the first indication information in the DCI and send the DCI to the user equipment.

In some examples, a preset value of a specified information domain in the DCI is used to indicate the content corresponding to the first indication information; or
a preset combination of values of the specified information domain in the DCI is used to indicate the content corresponding to the first indication information.

Figure 8:
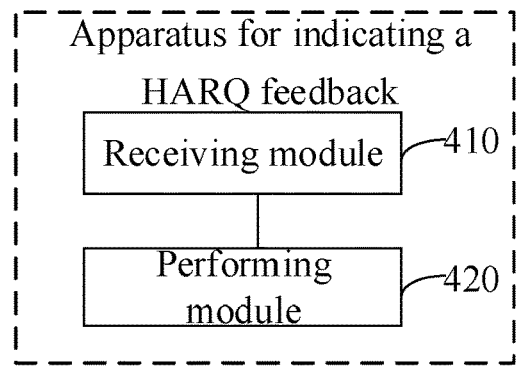
FIG. 8 is a block diagram illustrating another apparatus for indicating a sidelink HARQ feedback according to one or more examples of the present disclosure.

FIG. 8 is a block diagram illustrating another apparatus for indicating a sidelink Hybrid Automatic Repeat reQuest (HARQ) feedback according to one or more examples of the present disclosure. The apparatus is applied to a user equipment and includes:
a receiving module 410, configured to receive a downlink control signaling from a base station, where the downlink control signaling includes a target resource allocated by the base station to the user equipment to perform sidelink communication and first indication information;
an performing module 420, configured to, according to indication of the first indication information, perform a sidelink HARQ feedback operation and/or report a sidelink HARQ feedback result to the base station;
where the first indication information indicates at least one of the followings:
when the user equipment uses the target resource allocated by the base station to perform sidelink unicast communication, whether to perform the sidelink HARQ feedback;
when the user equipment uses the target resource allocated by the base station to perform sidelink multicast communication, whether to perform the sidelink HARQ feedback;
when the user equipment uses the target resource allocated by the base station to perform the sidelink multicast communication, a feedback manner of performing the sidelink HARQ feedback.

Figure 9:
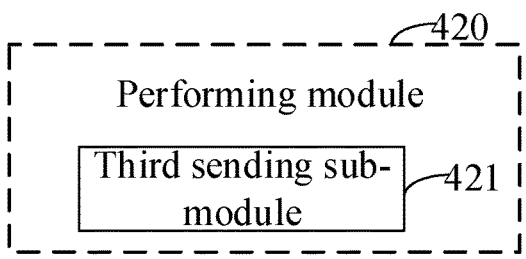
FIG. 9 is a block diagram illustrating an apparatus for indicating a sidelink HARQ feedback according to one or more examples of the present disclosure.

FIG. 9 is a block diagram illustrating another apparatus for indicating a sidelink Hybrid Automatic Repeat reQuest (HARQ) feedback base on the example of FIG. 8. The performing module 420 includes:
a third sending sub-module 421, configured to, when the user equipment is taken as a sending end device of the sidelink communication, send fourth indication information to a receiving end device of the sidelink communication based on the first indication information;
where the fourth indication information includes at least one of the followings:
whether to perform the sidelink HARQ feedback;
when the sidelink communication is multicast communication, the feedback manner of performing the sidelink HARQ feedback.

Figure 10:
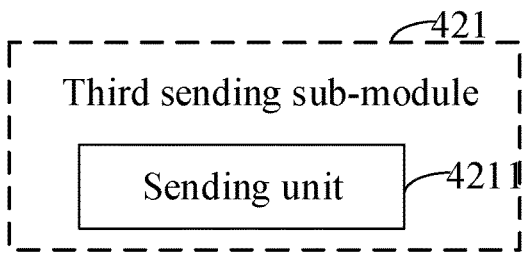
FIG. 10 is a block diagram illustrating another apparatus for indicating a sidelink HARQ feedback according to one or more examples of the present disclosure.

FIG. 10 is a block diagram illustrating another apparatus for indicating a sidelink Hybrid Automatic Repeat reQuest (HARQ) feedback base on the example of FIG. 9. The third sending sub-module 421 includes:
a sending unit 4211, configured to carry the fourth indication information in sidelink control information (SCI) and send the SCI to the receiving end device.

Figure 11:
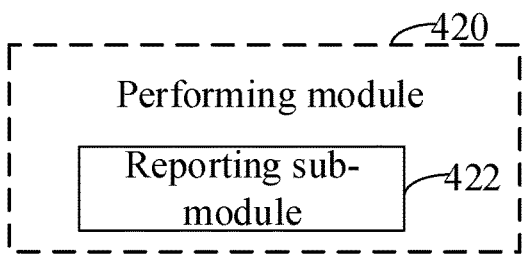
FIG. 11 is a block diagram illustrating an apparatus for indicating a sidelink HARQ feedback according to one or more examples of the present disclosure.

FIG. 11 is a block diagram illustrating another apparatus for indicating a sidelink Hybrid Automatic Repeat reQuest (HARQ) feedback base on the example of FIG. 8. The performing module 420 includes:
a reporting sub-module 422, configured to, when the first indication information indicates not performing the sidelink HARQ feedback, report a correct reception (ACK) result to the base station.

In some examples, the downlink control signaling includes second indication information; where the second indication information indicates that the sidelink communication performed by the user equipment is the sidelink unicast communication or the sidelink multicast communication; or the downlink control signaling includes third indication information; where the third indication information indicates a target address for performing the sidelink communication, and the target address indicates the sidelink communication performed by the user equipment is the sidelink unicast communication or the sidelink multicast communication;

when the second indication information or the target address indicates the sidelink communication performed by the user equipment is the sidelink unicast communication, the first indication information indicates, when the user equipment uses the target resource allocated by the base station to perform the sidelink unicast communication, whether to perform the sidelink HARQ feedback;

when the second indication information or the target address indicates the sidelink communication performed by the user equipment is the sidelink multicast communication, the first indication information indicates at least one of the followings:

when the user equipment uses the target resource allocated by the base station to perform the sidelink multicast communication, whether to perform the sidelink HARQ feedback;

when the user equipment uses the target resource allocated by the base station to perform the sidelink multicast communication, the feedback manner of performing the sidelink HARQ feedback.

Figure 12:
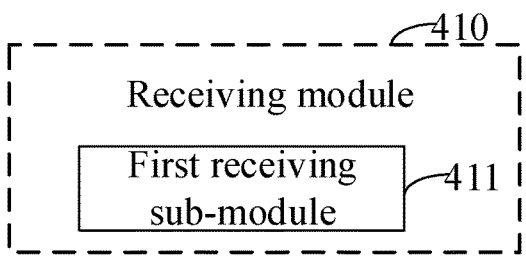
FIG. 12 is a block diagram illustrating another apparatus for indicating a sidelink HARQ feedback according to one or more examples of the present disclosure.

FIG. 12 is a block diagram illustrating another apparatus for indicating a sidelink Hybrid Automatic Repeat reQuest (HARQ) feedback base on the example of FIG. 8. The receiving module 410 includes:

a first receiving sub-module 411, configured to receive downlink radio resource control (RRC) information used by the base station to configure the target resource for the user equipment, where the downlink RRC information carries the target resource and the first indication information.

In some examples, the downlink RRC information includes a pre-allocated information domain corresponding to the first indication information; or the downlink RRC information indicates the content corresponding to the first indication information based on whether a Physical Uplink Control CHannel (PUCCH) resource configuration used by the user equipment to report HARQ feedback information corresponding to the sidelink communication is included;

when the downlink RRC information includes the PUCCH resource configuration, it is determined that the content corresponding to the first indication information is that, when the user equipment uses the target resource allocated by the base station to perform the sidelink unicast communication or the sidelink multicast communication, the sidelink HARQ feedback is performed;

when the downlink RRC information does not include the PUCCH resource configuration, it is determined that the content corresponding to the first indication information is that, when the user equipment uses the target resource allocated by the base station to perform the sidelink unicast communication or the sidelink multicast communication, the sidelink HARQ feedback is not performed.

Figure 13:
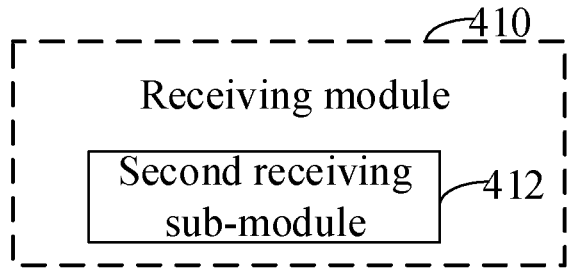
FIG. 13 is a block diagram illustrating another apparatus for indicating a sidelink HARQ feedback according to one or more examples of the present disclosure.

FIG. 13 is a block diagram illustrating another apparatus for indicating a sidelink Hybrid Automatic Repeat reQuest (HARQ) feedback base on the example of FIG. 8. The receiving module 410 includes:

a second receiving sub-module 412, configured to receive downlink control information (DCI) used by the base station to schedule the target resource for the user equipment, where the target resource and the first indication information are carried in the DCI.

In some examples, the DCI indicates the content corresponding to the first indication information by using a preset value of a specified information domain; or the DCI indicates the content corresponding to the first indication information by using a preset combination of values of the specified information domain.

Since the apparatus examples are basically similar to the method examples, reference may be made to the descriptions of the method examples for relevant parts. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

Correspondingly, a computer readable storage medium with computer programs stored thereon is further provided in the present disclosure, where the computer programs are executed to implement the method of indicating a sidelink HARQ feedback according to any one of the above items at base station side.

Correspondingly, a computer readable storage medium with computer programs stored thereon is further provided in the present disclosure, where the computer programs are executed to implement the method of indicating a sidelink HARQ feedback according to any one of the above items at user equipment side.

Correspondingly, an apparatus for indicating a sidelink Hybrid Automatic Repeat reQuest (HARQ) feedback is further provided in the present disclosure. The apparatus is applied to a base station and includes:

a processor;

a memory configured to store instructions executable by the processor;

where, the processor is configured to:

allocate a target resource to a user equipment to perform sidelink communication;

send a downlink control signaling to the user equipment, where the downlink control signaling includes the target resource and first indication information; the first indication information indicates at least one of the followings:

when the user equipment uses the target resource allocated by the base station to perform sidelink unicast communication, whether to perform the sidelink HARQ feedback;

when the user equipment uses the target resource allocated by the base station to perform sidelink multicast communication, whether to perform the sidelink HARQ feedback;

when the user equipment uses the target resource allocated by the base station to perform the sidelink multicast communication, a feedback manner of performing the sidelink HARQ feedback.

Figure 14:
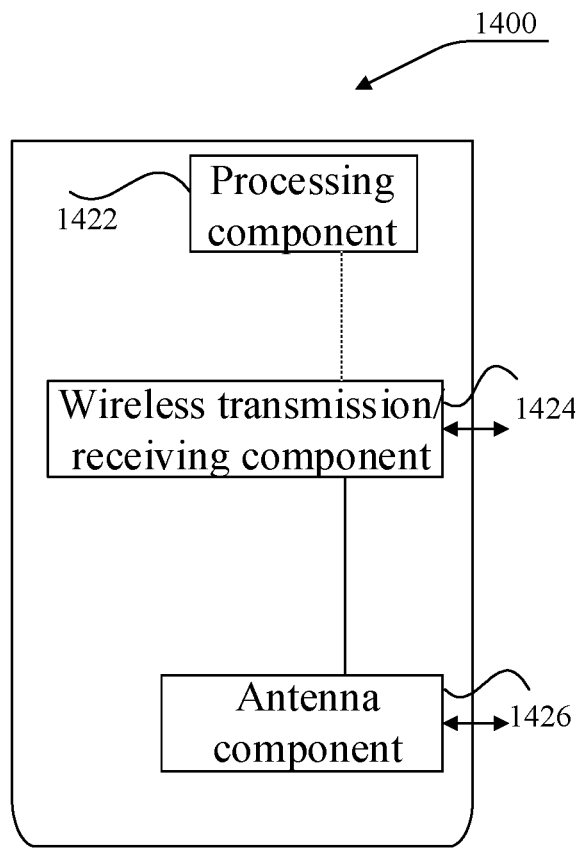
FIG. 14 is a structural schematic diagram illustrating an apparatus for indicating a sidelink HARQ feedback according to one or more examples of the present disclosure.

FIG. 14 is a structural schematic diagram illustrating an apparatus 1400 for indicating a sidelink HARQ feedback according to one or more examples of the present disclosure. The apparatus 1400 may be provided as a base station. As shown in FIG. 14, the apparatus 1400 includes a process component 1422, a wireless transmission/reception component 1424, an antenna component 1426, and a signal processing part specific to wireless interface, where the processing component 1422 may further include one or more processors.

One processor of the processing component 1422 may be configured to implement any method of indicating a sidelink HARQ feedback as above.

Correspondingly, an apparatus for indicating a sidelink Hybrid Automatic Repeat reQuest (HARQ) feedback is further provided in the present disclosure. The apparatus is applied to a user equipment and includes:
a processor;
a memory configured to store instructions executable by the processor;
where, the processor is configured to:
receive a downlink control signaling from a base station, where the downlink control signaling includes a target resource allocated by the base station to the user equipment to perform sidelink communication and first indication information;
according to indication of the first indication information, perform a sidelink HARQ feedback operation and/or reporting a sidelink HARQ feedback result to the base station;
where the first indication information indicates at least one of the followings:
when the user equipment uses the target resource allocated by the base station to perform sidelink unicast communication, whether to perform the sidelink HARQ feedback;
when the user equipment uses the target resource allocated by the base station to perform sidelink multicast communication, whether to perform the sidelink HARQ feedback;
when the user equipment uses the target resource allocated by the base station to perform the sidelink multicast communication, a feedback manner of performing the sidelink HARQ feedback.

Figure 15:
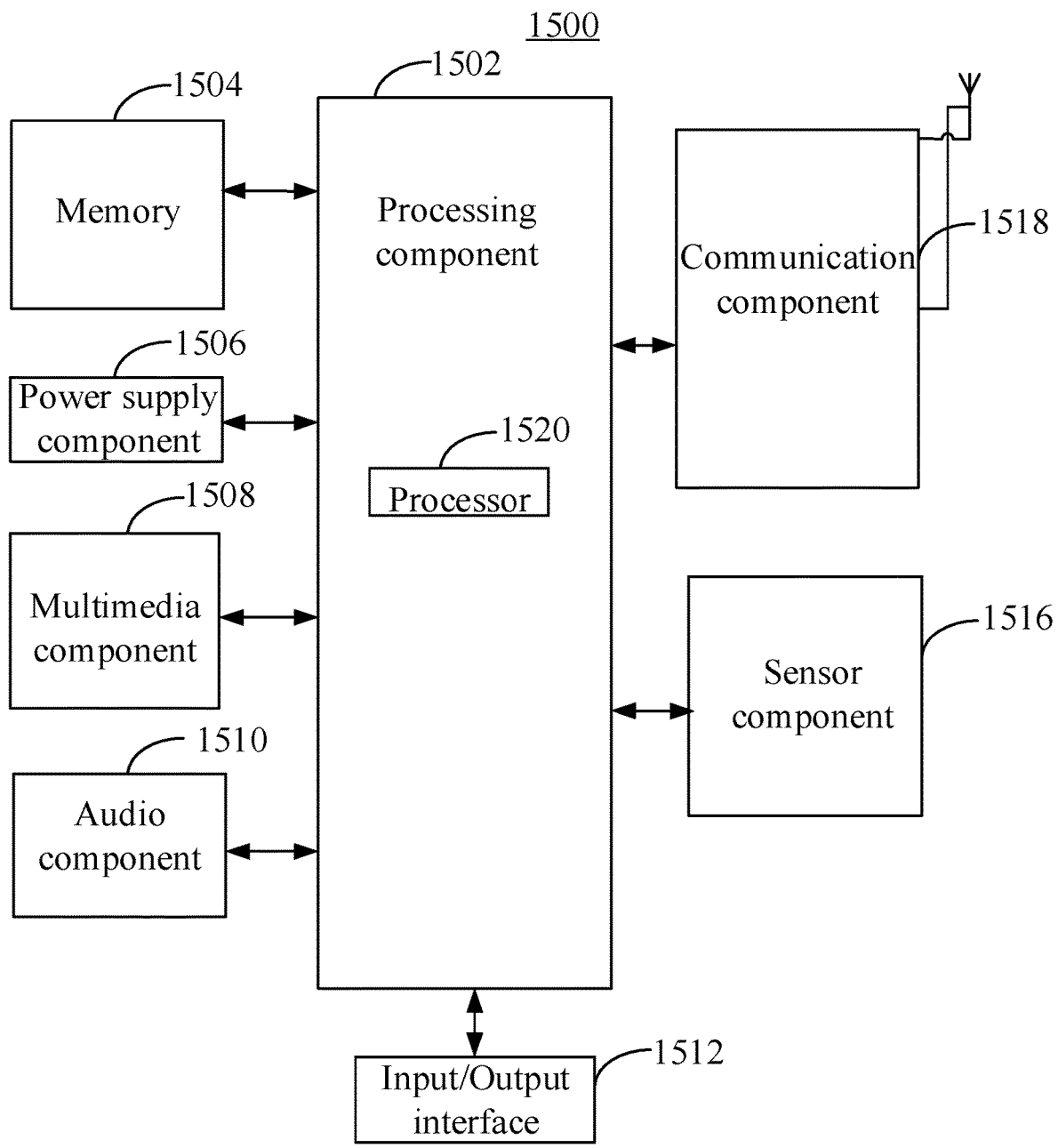
FIG. 15 is a structural schematic diagram illustrating another apparatus for indicating a sidelink HARQ feedback according to one or more examples of the present disclosure.

FIG. 15 is a block diagram illustrating an apparatus 1500 for indicating a sidelink HARQ feedback according to one or more examples of the present disclosure. For example, the apparatus 1500 may be a user equipment such as smart phone, tablet computer, electronic book reader, multimedia play device, wearable device, vehicle-mounted device and the like.

As shown in FIG. 15, the apparatus 1500 may include one or more of the following components: a processing component 1502, a memory 1504, a power supply component 1506, a multimedia component 1508, an audio component 1510, an input/output (I/O) interface 1512, a sensor component 1516 and a communication component 1518.

The processing component 1502 generally controls overall operations of the apparatus 1500, such as operations associated with display, phone calls, data communications, camera operations, and recording operations. The processing component 1502 may include one or more processors 1520 to execute instructions to complete all or part of the steps of the above methods. In addition, the processing component 1502 may include one or more modules which facilitate the interaction between the processing component 1502 and other components. For example, the processing component 1502 may include a multimedia module to facilitate the interaction between the multimedia component 1508 and the processing component 1502. For another example, the processing component 1502 may read instructions from the memory to perform the steps of the method of indicating a sidelink HARQ feedback according to the above examples.

The memory 1504 is configured to store various types of data to support the operation of the apparatus 1500. Examples of such data include instructions for any application or method operated on the apparatus 1500, contact data, phonebook data, messages, pictures, videos, and so on. The memory 1504 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1506 supplies power for different components of the apparatus 1500. The power supply component 1506 may include a power supply management system, one or more power supplies, and other components associated with generating, managing and distributing power for the apparatus 1500.

The multimedia component 1508 includes a screen that provides an output interface between the apparatus 1500 and a user. In some examples, the multimedia component 1508 includes a front camera and/or a rear camera. When the apparatus 1500 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1510 is configured to output and/or input audio signals. For example, the audio component 1510 includes a microphone (MIC) configured to receive an external audio signal when the apparatus 1500 is in an operation mode, such as a call mode, a recording mode, and a voice recognition mode. The received audio signal may be further stored in the memory 1504 or transmitted via the communication component 1518. In some examples, the audio component 1510 also includes a loudspeaker for outputting an audio signal.

The I/O interface 1512 provides an interface between the processing component 1502 and a peripheral interface module which may be a keyboard, a click wheel, a button, or the like. These buttons may include, but are not limited to a home button, a volume button, a start button, and a lock button.

The sensor component 1516 includes one or more sensors for providing a status assessment in various aspects to the apparatus 1500. For example, the sensor component 1516 may detect an open/closed state of the apparatus 1500, and the relative positioning of components, for example, the component is a display and a keypad of the apparatus 1500. The sensor component 1516 may also detect a change in position of the apparatus 1500 or a component of the apparatus 1500, the presence or absence of a user in contact with the apparatus 1500, the orientation or acceleration/deceleration of the apparatus 1500 and a change in temperature of the apparatus 1500. The sensor component 1516 may include a proximity sensor configured to detect the presence of nearby objects without any physical contact. The sensor component 1516 may also include a light sensor, such as a CMOS or CCD image sensor, for use in imaging applications. In some examples, the sensor component 1516 may also include an acceleration sensor, a gyro sensor, a magnetic sensor, a pressure sensor, or a temperature sensor.

The communication component 1518 is configured to facilitate wired or wireless communication between the apparatus 1500 and other devices. The apparatus 1500 may access a wireless network based on a communication standard, such as WiFi, 2G or 3G, 4G or 5G a combination thereof. In an example, the communication component 1518 receives broadcast signals or broadcast associated information from an external broadcast management system via a broadcast channel. In an example, the communication component 1518 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the apparatus 1500 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is further provided a non-transitory machine readable storage medium including instructions, for example, the memory 1504 including instructions. The above instructions may be executed by the processor 1502 of the apparatus 1500 to implement the above methods. For example, the non-transitory machine readable storage medium may be Read Only Memory (ROM), Random Access Memory (RAM), CD-ROM, magnetic tape, floppy disk, and optical data storage device and the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means that are not disclosed in the present disclosure. The specification and examples are considered as exemplary only.

In the examples of the present disclosure, a base station may allocate a target resource to a user equipment to perform sidelink communication and send a downlink control signaling including the target resource and first indication information to the user equipment. The base station may indicate, by the first indication information, at least one of: when the user equipment uses the target resource to perform sidelink unicast communication, whether to perform sidelink HARQ feedback; when the user equipment uses the target resource to perform sidelink multicast communication, whether to perform the sidelink HARQ feedback, and when the user equipment uses the target resource to perform the sidelink multicast communication, the feedback manner of performing the sidelink HARQ feedback. By the above process, for the target resource allocated by the base station to the user equipment, whether to perform the HARQ feedback when the user equipment uses the target resource allocated by the base station to the user equipment to perform the sidelink unicast communication and/or the sidelink multicast communication, and the feedback manner of performing the sidelink HARQ feedback in response to the sidelink multicast communication are indicated.

In the examples of the present disclosure, when the base station allocates the target resource to the user equipment to perform the sidelink unicast communication, correspondingly, the first indication information may indicate, when the user equipment uses the target resource allocated by the base station to perform the sidelink unicast communication, whether to perform the sidelink HARQ feedback. In response to sidelink unicast communication, the user equipment has only one feedback manner of performing the sidelink HARQ feedback. Therefore, in the above manner, for the target resource allocated by the base station to the user equipment to perform the sidelink unicast communication, whether to perform the sidelink HARQ feedback when the user equipment performs the sidelink unicast communication is determined.

In the examples of the present disclosure, if the base station allocates the target resource to the user equipment to perform the sidelink multicast communication, the first indication information may indicate: when the user equipment uses the target resource allocated by the base station to perform the sidelink multicast communication, whether to perform the sidelink HARQ feedback, and/or when the user equipment uses the target resource allocated by the base station to perform the sidelink multicast communication, the feedback manner of performing the sidelink HARQ feedback. In this manner, for the target resource allocated by the base station to the user equipment to perform the sidelink multicast communication, whether to perform the sidelink HARQ feedback when the user equipment performs the sidelink multicast communication and the feedback manner of performing the sidelink HARQ feedback are determined.

In the examples of the present disclosure, a downlink control signaling may further include second indication information or third indication information. The second indication information indicates the sidelink communication performed by the user equipment is the sidelink unicast communication or the sidelink multicast communication and the target address indicates the sidelink communication performed by the user equipment is the sidelink unicast communication or the sidelink multicast communication. When the second indication information or the target address indicates the sidelink unicast communication or the sidelink multicast communication, the user equipment may determine whether to perform the sidelink HARQ feedback and a corresponding sidelink HARQ feedback manner based on the content of the first indication information, thereby increasing the availability.

In the examples of the present disclosure, when the base station uses downlink RRC information to configure the target resource for the user equipment, the downlink RRC information may carry the target resource and the first indication information and then be sent to the user equipment. In the above process, the base station may carry the target resource and the first indication information by the downlink RRC information, saving signaling resource, bringing easy implementation and high availability.

In the examples of the present disclosure, the downlink RRC information sent by the base station may directly include a pre-allocated information domain corresponding to the first indication information, and the user equipment may, based on a bit value of the information domain, determine the content of the first indication information. Alternatively, the downlink RRC information sent by the base station may not include the information domain but implicitly indicate the content to be indicated by the first indication information based on whether a Physical Uplink Control CHannel (PUCCH) resource configuration used by the user equipment to report HARQ feedback information corresponding to the sidelink communication is included. In the above manner, the user equipment is enabled to quickly determine the content of the first indication information, leading to high availability.

In the examples of the present disclosure, the base station may also use downlink control information (DCI) for scheduling the target resource to carry the target resource and the first indication information and send the DCI to the user equipment. In the above process, the base station may carry the target resource and the first indication information by the DCI, thus saving signaling resource, bringing easy implementation and high availability.

In the examples of the present disclosure, the base station may indicate the content corresponding to the first indication information by use of a preset value of a specified information domain in the DCI, or indicate the content corresponding to the first indication information by use of a preset combination of values of the specified information domain in the DCI. In the above process, the user equipment is enabled to quickly determine the content of the first indication information, leading to high availability.

In the examples of the present disclosure, after receiving the downlink control signaling sent by the base station, the user equipment may, based on indication of the first indication information included in the downlink control signaling, perform a sidelink HARQ feedback operation and/or report a sidelink HARQ feedback result to the base station. The first indication information indicates at least one of: when the user equipment uses the target resource allocated by the base station to perform the sidelink unicast communication or the sidelink multicast communication, whether to perform the sidelink HARQ feedback; and when the user equipment uses the target resource allocated by the base station to perform the sidelink multicast communication, a feedback manner of performing the sidelink HARQ feedback. In the above process, for the target resource allocated by the base station to the user equipment, the user equipment may, based on the indication of the first indication information, perform the sidelink HARQ feedback operation and/or report the sidelink HARQ feedback result to the base station in response to using the target resource to perform the sidelink unicast communication and/or the sidelink multicast communication.

It is to be understood that the present disclosure is not limited to the precise structure described above and shown in the accompanying drawings, and that various modifications and changes may be made without departing from the scope thereof.

The invention claimed is:

1. A method of indicating a sidelink Hybrid Automatic Repeat reQuest (HARQ) feedback, comprising:
   allocating, by a base station, a target resource to a user equipment to perform sidelink communication; and
   sending, by the base station, a downlink control signaling to the user equipment, wherein the downlink control signaling comprises the target resource and first indication information; the first indication information is configured for at least one of followings:
   in response to determining that the user equipment uses the target resource allocated by the base station to perform sidelink unicast communication, indicating whether to perform the sidelink HARQ feedback;
   in response to determining that the user equipment uses the target resource allocated by the base station to perform sidelink multicast communication, indicating whether to perform the sidelink HARQ feedback; or
   in response to determining that the user equipment uses the target resource allocated by the base station to perform the sidelink multicast communication, indicating a feedback manner of performing the sidelink HARQ feedback;
   wherein the feedback manner indicates feedback operations performed by a data receiving end of the sidelink multicast communication, a data sending end of the sidelink multicast communication being the user equipment, and the feedback manner comprises one of:
   feeding back, by the data receiving end, NACK only in response to incorrect reception of data; or
   feeding back, by the data receiving end, ACK in response to correct reception of data, and feeding back NACK in response to incorrect reception of data;
   wherein the downlink control signaling further comprises second indication information; wherein the second indication information indicates that the sidelink communication performed by the user equipment is the sidelink unicast communication or the sidelink multicast communication; or
   the downlink control signaling further comprises third indication information; wherein the third indication information indicates a target address for performing the sidelink communication, and the target address indicates the sidelink communication performed by the user equipment is the sidelink unicast communication or the sidelink multicast communication.

2. The method of claim 1, wherein allocating the target resource to the user equipment to perform the sidelink communication comprises:
   allocating the target resource to the user equipment to perform the sidelink unicast communication;
   wherein the first indication information indicates, in response to determining that the user equipment uses the target resource allocated by the base station to perform the sidelink unicast communication, whether to perform the sidelink HARQ feedback.

3. The method of claim 1, wherein allocating the target resource to the user equipment to perform the sidelink communication comprises:
   allocating the target resource to the user equipment to perform the sidelink multicast communication;
   wherein the first indication information indicates at least one of followings:
   in response to determining that the user equipment uses the target resource allocated by the base station to perform the sidelink multicast communication, whether to perform the sidelink HARQ feedback; or
   in response to determining that the user equipment uses the target resource allocated by the base station to perform the sidelink multicast communication, the feedback manner of performing the sidelink HARQ feedback.

4. The method of claim 1, wherein sending the downlink control signaling to the user equipment comprises:
   in response to determining that downlink radio resource control (RRC) information is to configure the target resource for sending at least one of a sidelink communication control channel or data channel for the user equipment, carrying the target resource and the first indication information in the downlink RRC information and sending the downlink RRC information to the user equipment.

5. The method of claim 4, wherein the downlink RRC information comprises a pre-allocated information domain corresponding to the first indication information; or
    the downlink RRC information indicates a content corresponding to the first indication information based on whether a Physical Uplink Control CHannel (PUCCH) resource configuration adopted by the user equipment to report HARQ feedback information corresponding to the sidelink communication is comprised.

6. The method of claim 1, wherein sending the downlink control signaling to the user equipment comprises:
    in response to determining that downlink control information (DCI) is configured to schedule the target resource for sending at least one of the sidelink communication control channel or data channel for the user equipment, carrying the target resource and the first indication information in the DCI and sending the DCI to the user equipment.

7. The method of claim 6, wherein a preset value of a specified information domain in the DCI is configured to indicate the content corresponding to the first indication information; or
    a preset combination of values of the specified information domain in the DCI is configured to indicate the content corresponding to the first indication information.

8. A base station, comprising:
    a processor; and
    a memory configured to store instructions executable by the processor;
    wherein, the processor is configured to perform the method of indicating a sidelink HARQ feedback as claimed in claim 1.

9. A method of indicating a sidelink Hybrid Automatic Repeat reQuest (HARQ) feedback, comprising:
    receiving, by a user equipment, a downlink control signaling from a base station, wherein the downlink control signaling comprises a target resource allocated by the base station to the user equipment to perform sidelink communication and first indication information; and
    performing, by the user equipment, a sidelink HARQ feedkback operation and reporting a sidelink HARQ feedback result to the base station according to indication of the first indication information;
    wherein the first indication information is configured for at least one of followings:
    in response to determining that the user equipment uses the target resource allocated by the base station to perform sidelink unicast communication, indicating whether to perform the sidelink HARQ feedback;
    in response to determining that the user equipment uses the target resource allocated by the base station to perform sidelink multicast communication, indicating whether to perform the sidelink HARQ feedback; or
    in response to determining that the user equipment uses the target resource allocated by the base station to perform the sidelink multicast communication, indicating a feedback manner of performing the sidelink HARQ feedback;
    wherein performing the sidelink HARQ feedback operation according to the indication of the first indication information, comprises:
    in response to determining that the user equipment is taken as a sending end device of the sidelink communication, sending specific indication information to a receiving end device of the sidelink communication based on the first indication information;
    wherein the specific indication information is configured for at least one of indicating whether to perform the sidelink HARQ feedback; or
    in response to determining that the sidelink communication is the sidelink multicast communication, indicating the feedback manner of performing the sidelink HARQ feedback;
    wherein the feedback manner comprises one of:
    feeding back, by the receiving end device, NACK only in response to incorrect reception of data; or
    feeding back, by the receiving end device, ACK in response to correct reception of data, and feeding back NACK in response to incorrect reception of data.

10. The method of claim 9, wherein sending the specific indication information to the receiving end device of the sidelink communication comprises:
    carrying the specific indication information in sidelink control information (SCI) and sending the SCI to the receiving end device.

11. The method of claim 9, wherein reporting the sidelink HARQ feedback result to the base station according to the indication of the first indication information, comprises:
    in response to determining that the first indication information indicates not performing the sidelink HARQ feedback, reporting a correct reception (ACK) result to the base station.

12. The method of claim 9, wherein the downlink control signaling comprises second indication information; wherein the second indication information indicates that the sidelink communication performed by the user equipment is the sidelink unicast communication or the sidelink multicast communication; or
    the downlink control signaling comprises third indication information; wherein the third indication information indicates a target address for performing the sidelink communication, and the target address indicates the sidelink communication performed by the user equipment is the sidelink unicast communication or the sidelink multicast communication;
    in response to determining that the second indication information or the target address indicates the sidelink communication performed by the user equipment is the sidelink unicast communication, the first indication information indicates, in response to that the user equipment uses the target resource allocated by the base station to perform the sidelink unicast communication, whether to perform the sidelink HARQ feedback;
    in response to determining that the second indication information or the target address indicates the sidelink communication performed by the user equipment is the sidelink multicast communication, the first indication information indicates at least one of the followings:
    in response to determining that the user equipment uses the target resource allocated by the base station to perform the sidelink multicast communication, whether to perform the sidelink HARQ feedback; or
    in response to determining that the user equipment uses the target resource allocated by the base station to perform the sidelink multicast communication, the feedback manner of performing the sidelink HARQ feedback.

13. The method of claim 9, wherein receiving the downlink control signaling from the base station comprises:

receiving downlink radio resource control (RRC) information used by the base station to configure the target resource for the user equipment, wherein the downlink RRC information carries the target resource and the first indication information.

14. The method of claim 13, wherein the downlink RRC information comprises a pre-allocated information domain corresponding to the first indication information; or the downlink RRC information indicates the content corresponding to the first indication information based on whether a Physical Uplink Control CHannel (PUCCH) resource configuration used by the user equipment to report HARQ feedback information corresponding to the sidelink communication is comprised;

in response to determining that the downlink RRC information comprises the PUCCH resource configuration, it is determined that the content corresponding to the first indication information is that, in response to that the user equipment uses the target resource allocated by the base station to perform the sidelink unicast communication or the sidelink multicast communication, the sidelink HARQ feedback is performed;

in response to determining that the downlink RRC information does not comprise the PUCCH resource configuration, it is determined that the content corresponding to the first indication information is that, in response to that the user equipment uses the target resource allocated by the base station to perform the sidelink unicast communication or the sidelink multicast communication, the sidelink HARQ feedback is not performed.

15. The method of claim 9, wherein receiving the downlink control signaling sent by the base station comprises:

receiving downlink control information (DCI) used by the base station to schedule the target resource for the user equipment, wherein the target resource and the first indication information are carried in the DCI.

16. The method of claim 15, wherein the DCI indicates the content corresponding to the first indication information by using a preset value of a specified information domain; or the DCI indicates the content corresponding to the first indication information by using a preset combination of values of the specified information domain.

17. A non-transitory computer readable storage medium with computer programs stored thereon, wherein the computer programs are executed to implement the method of indicating a sidelink HARQ feedback as claimed in claim 9.

18. A user equipment, comprising:
a processor; and
a memory configured to store instructions executable by the processor;

wherein, the processor is configured to:
receive a downlink control signaling from a base station, wherein the downlink control signaling comprises a target resource allocated by the base station to the user equipment to perform sidelink communication and first indication information; and
perform a sidelink HARQ feedback operation and report a sidelink HARQ feedback result to the base station according to indication of the first indication information;

wherein the first indication information is configured for at least one of the followings:
in response to determining that the user equipment uses the target resource allocated by the base station to perform sidelink unicast communication, indicating whether to perform the sidelink HARQ feedback;
in response to determining that the user equipment uses the target resource allocated by the base station to perform sidelink multicast communication, indicating whether to perform the sidelink HARQ feedback; or
in response to determining that the user equipment uses the target resource allocated by the base station to perform the sidelink multicast communication, indicating a feedback manner of performing the sidelink HARQ feedback;

wherein performing the sidelink HARQ feedback operation according to the indication of the first indication information, comprises:
in response to determining that the user equipment is taken as a sending end device of the sidelink communication, sending specific indication information to a receiving end device of the sidelink communication based on the first indication information;

wherein the specific indication information is configured for at least one of followings:
indicating whether to perform the sidelink HARQ feedback; or
in response to determining that the sidelink communication is the sidelink multicast communication, indicating the feedback manner of performing the sidelink HARQ feedback;

wherein the feedback manner comprises one of:
feeding back, by the receiving end device, NACK only in response to incorrect reception of data; or
feeding back, by the receiving end device, ACK in response to correct reception of data, and feeding back NACK in response to incorrect reception of data.

* * * * *